May 15, 1928.  
E. E. GRAVES  
AUTOMOBILE BUMPER  
Filed Nov. 9, 1927  
1,669,612
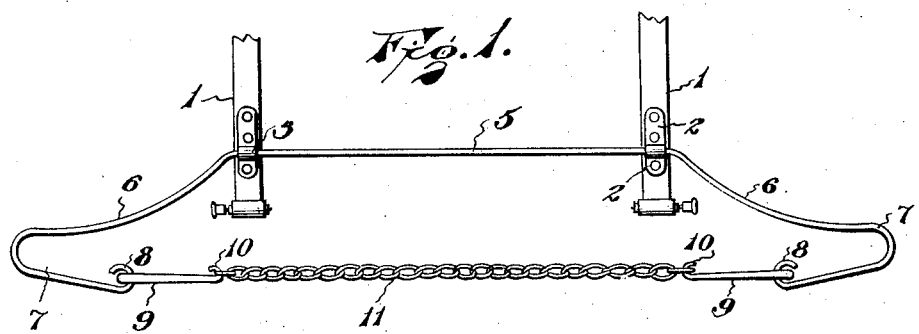
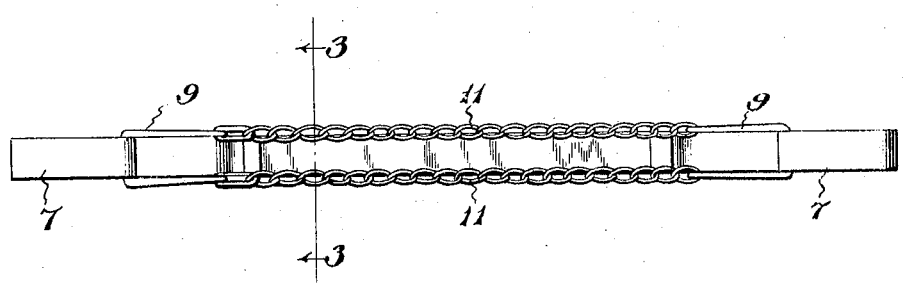
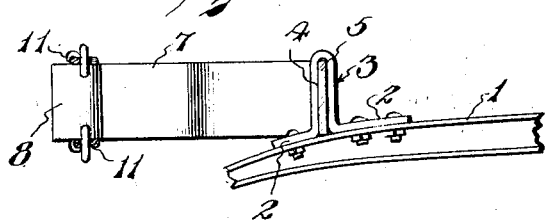
Inventor  
E. E. Graves  
By Lacey & Lacey, Attorneys Patented May 15, 1928.

1,669,612

UNITED STATES PATENT OFFICE.

EMERY E. GRAVES, OF SYRACUSE, NEW YORK.

AUTOMOBILE BUMPER.

Application filed November 9, 1927. Serial No. 232,109.

The present invention is directed to improvements in automobile bumpers.

The primary object of the invention is to provide a device of this character so constructed that it will withstand hard blows without injury, the construction being extremely simple, durable and cheap to manufacture.

Another object of the invention is to provide a bumper including a pair of chain sections so mounted that they will be maintained under tension to prevent sagging, and at the same time be capable of flexing when subjected to impact to absorb the shock of such impact.

With these and other objects in view this invention resides in the novel features of construction, formation, combination and arrangement of parts to be hereinafter more fully described, claimed and illustrated in the accompanying drawing, in which,—

Figure 1 is a top plan view of the bumper showing the same connected with the side bars of an automobile frame.

Figure 2 is a front view of the bumper.

Figure 3 is a sectional view on the line 3—3 of Figure 2.

Referring to the drawing, 1 designates the front portions of the side bars of an automobile frame and upon which are bolted the flanges 2 of the brackets 3, said brackets having sockets 4 formed therein.

The bumper per se, comprises a metallic bar 5, the ends of which terminate in forwardly extended longitudinally curved sections 6 which terminate in U-shaped portions 7, which in turn have their terminals formed with hooks 8, the purpose of which will be later explained.

These hooks are designed for engaging the bight portions of the yokes 9, the terminals of the arms of said yokes being provided with hooks 10. Extending between the yokes 9 is a pair of chain sections 11, the terminal links of each chain being engaged with the hooks 10 of the yokes. Owing to the inherent resiliency of the bar 5, the chain sections 11 will be maintained under tension and held against sagging, and will obviously be permitted to give slightly under impact.

It will be of course understood that before the brackets 3 are bolted to the bars 1 the ends of the bars 5 are placed in the sockets 4 and firmly gripped therein and held against endwise movement.

Further, it will be obvious that should one of the chain sections break the yokes 9 will be maintained in place, thereby supporting the other chain until a new one can be substituted for the broken one.

Having thus described the invention, I claim:

A bumper comprising a bar having hooks upon its terminals, yokes engaged with the hooks and having their arms provided with terminal hooks, a pair of chain sections extending between the bar terminals and having their terminals engaged with the hooks of the arms of the yokes.

In testimony whereof I affix my signature.

MR. EMERY E. GRAVES. [L. S.]